(12) United States Patent
Kirby et al.

(10) Patent No.: US 12,370,480 B2
(45) Date of Patent: Jul. 29, 2025

(54) DYNAMIC PARTICLE SEPARATION FOR USE IN HVAC SYSTEMS

(71) Applicant: KBC Air Designs LLC, Reno, NV (US)

(72) Inventors: Jeffrey E. Kirby, Reno, NV (US); Ben Barlow, Spark, NV (US); Jace Cook, Fernley, NV (US)

(73) Assignee: KBC AIR DESIGNS LLC, Reno, NV (US)

( * ) Notice: Subject to any disclaimer, the term of this patent is extended or adjusted under 35 U.S.C. 154(b) by 347 days.

(21) Appl. No.: 18/086,782

(22) Filed: Dec. 22, 2022

(65) Prior Publication Data

US 2023/0191296 A1     Jun. 22, 2023

Related U.S. Application Data

(60) Provisional application No. 63/292,723, filed on Dec. 22, 2021.

(51) Int. Cl.
*B01D 45/16* (2006.01)
*B01D 45/18* (2006.01)
*F24F 8/183* (2021.01)

(52) U.S. Cl.
CPC ............. *B01D 45/16* (2013.01); *B01D 45/18* (2013.01); *F24F 8/183* (2021.01)

(58) Field of Classification Search
CPC ................................ B01D 45/12; B01D 45/16
See application file for complete search history.

(56) References Cited

U.S. PATENT DOCUMENTS

| | | | |
|---|---|---|---|
| 4,098,077 A * | 7/1978 | Edmaier | .................. F16M 3/00 60/272 |
| 5,562,746 A | 10/1996 | Raether | |
| 6,270,544 B1 | 8/2001 | Mencher et al. | |
| 6,508,052 B1 | 1/2003 | Snyder et al. | |
| 8,262,761 B2 | 9/2012 | Babb et al. | |
| 8,439,295 B2 | 5/2013 | Belyew | |
| 9,856,834 B2 * | 1/2018 | Rosenfeld | ............ F02M 35/086 |
| 11,135,537 B2 | 10/2021 | Perl-Olshvang et al. | |
| 11,413,631 B2 | 8/2022 | Meirav et al. | |

(Continued)

OTHER PUBLICATIONS

International Search Report, PCT/US22/53751, Apr. 24, 2023, 9 pages.

*Primary Examiner* — Robert A Hopkins
(74) *Attorney, Agent, or Firm* — Edell, Shapiro & Finnan, LLC (57) ABSTRACT

An air filter system for use as original equipment or conventional filter replacement in a building ventilation system includes multiple helical particle separator elements in a parallel array, each element configured to remove particles from a respective portion of contaminated inflowing air. The outflows from the separator elements are combined into a common clean air outflow which is delivered to the building ventilation system. A common waste receptable collects particles removed by the separator elements and is cooperatively connected to a scavenger air system that draws air through the array and the receptable and relocates them to a desired location. The separator element array may be housed in a filter system containing the main system fan arrangement that is configured to draw or force the airflow through the multiple particle separators.

15 Claims, 11 Drawing Sheets

(56) References Cited

U.S. PATENT DOCUMENTS

| | | |
|---|---|---|
| 2002/0059868 A1 | 5/2002 | Gogins et al. |
| 2003/0205038 A1 | 11/2003 | Goyetche |
| 2005/0232831 A1 | 10/2005 | Taylor et al. |
| 2006/0130445 A1 | 6/2006 | Park et al. |
| 2006/0161306 A1 | 7/2006 | Federspiel |
| 2007/0281205 A1 | 12/2007 | Wagner et al. |
| 2010/0275561 A1 | 11/2010 | Lundquist et al. |
| 2016/0097553 A1 | 4/2016 | Brian |
| 2016/0279556 A1 | 9/2016 | Law |
| 2018/0207573 A1 | 7/2018 | Perl-Olshvang et al. |
| 2018/0207651 A1 | 7/2018 | Meirav et al. |
| 2019/0299134 A1 | 10/2019 | Herman et al. |
| 2020/0360847 A1 | 11/2020 | Perl-Olshvang et al. |
| 2021/0107058 A1 | 4/2021 | Ruh et al. |

\* cited by examiner

DYNAMIC PARTICLE SEPARATION FOR USE IN HVAC SYSTEMS

CROSS REFERENCE TO RELATED APPLICATIONS

This application is a non-provisional application claiming priority from U.S. Provisional Application No. 63/292,723, entitled "Dynamic Particle Separation Units For Use In HVAC Systems", and filed Dec. 22, 2021, the disclosure in which is incorporated in its entirety herein by this reference.

TECHNICAL FIELD

The disclosure generally pertains to low maintenance air filtration systems using particle separation technology for HVAC systems in commercial and residential buildings.

BACKGROUND OF THE DISCLOSURE

Most HVAC systems include air filters that capture suspended particles in the air flow and prevent them from proceeding into a conditioned airstream. These conventional filters typically constitute an air-permeable medium (e.g., fiberglass, pleated polyester or cotton, HEPA, etc.) that allows air to flow through while particulate matter suspended in the air is captured within the medium. Many of these media are comprised of woven or non-woven fibers of various types and densities. Over the operating life of the filter, particulate matter accumulates in the medium which in turn gradually degrades its filter performance and air permeability, thereby increasing the system electrical power consumption and requiring frequent filter replacement with its concomitant expense.

One prior art approach to replacing air-permeable medium filters in HVAC systems is disclosed in U.S. Ser. No. 11/413,631 (Meirav et al), the entire disclosure in which is incorporated herein by reference. The Meirev et al system utilizes a fluid dynamic filtering approach wherein multiple vortex particle separator elements are deployed in an array wherein each element filters a respective portion of contaminated inflowing air. Although the use of fluid dynamics rather than a passive clog-susceptible filtering medium would be desirable, there are disadvantageous aspects of the Meirev et al system, one of which is energy inefficiency. In HVAC systems deployed in buildings, perpendicular or tangential turns in the airflow introduce flow resistance and concomitant pressure drops in the system, increasing the pressure (and hence, energy) required to move the air through the system. In the context of the Meirev et al filter system, each individual vortex element in the vortex element array redirects its portion of the contaminated axial flow to provide a tangential inflow to the wider input end of its conical vortex chamber which converts the tangential inflow to a vortical flow through the chamber. The tangential inflow is in a plane substantially oriented perpendicular to the received flow direction and to the longitudinal axis of the chamber. Centrifugal forces in the resulting vortical flow suspended particles in the air to be forced to the chamber wall in a particle-laden rotating boundary layer flow component, leaving a rotating central flow component that is substantially particle-free. The boundary layer is separated from the core proximate the downstream end of the chamber and caused to egress into a space where the contained particles are permitted to fall into a respective waste receptacle for the vortex separator element. The rotating air core passes through a narrow outflow opening and is combined with the air core outflows from the other vortex separators in the array. The combined air core outflows, each of which has some degree of turbulence introduces in the vortex chamber, are then converted to an axial flow that is passed on as filtered air to the system ducts. The conversion of the linearly inflowing contaminated air to the required tangential inflow, and the element outflow restriction resulting from the downstream narrowing of the vortex chamber, result in significant energy losses (i.e., pressure drops) in each vortex separator element.

A further disadvantage of the Meirav et al system is the requirement to set aside times to selectively remove collected particles from the several receptacles, which may result in system downtime and involves the time of maintenance personnel.

Another type of particle separator element, namely the helical particle separator, is known for use in removing particle matter from airflow through turbine jet engines. See US2021/0107058 (Ruh et al), for example, the entire disclosure in which is incorporated herein by reference. In helical separators air enters a generally cylindrical cavity axially and is swirled by stationary vanes helically oriented about the cylinder axis. The swirling of the contaminated air generates a composite airstream comprising a clean air core and a particulate-rich air boundary layer due to a centrifugal force generated on the particles as the contaminated air is helically swirled. The particulate-laden boundary air is ejected from the separator, and the clean air core remains axially directed through the cylindrical cavity and its downstream end at the outlet end of the separator element. The pressure drop in airflow through helical separators is significantly less than the pressure drop through vortex separators due (a) to the elimination of redirecting axial flow to a tangential flow and then back to axial flow as required in vortex separators, and (b) the absence of the flow restriction created in the vortex elements due to the downstream diameter reduction in the vortex chamber.

An object of the embodiments disclosed herein is to efficiently adapt fluid dynamic particle separator technology to HVAC systems to remove particulate matter from inflowing air on any scale with a minimum of energy loss. It will be understood that adapting engine air flow purification designs to optimally meet HVAC system requirements in commercial and residential buildings is not a trivial exercise, especially given the importance of reducing the energy used to provide cleaner air in these buildings. The embodiments disclosed herein address these design challenges.

SUMMARY

This Summary is provided to introduce a selection of concepts in a simplified form that are further described below in the Detailed Description. This Summary is not intended to identify key features or essential features of the claimed subject matter, nor is it intended as an aid in determining the scope of the claimed subject matter.

The embodiments disclosed herein employ multiple helical particle separators arranged in a parallel helical separator array to replace conventional air-permeable media filters in an HVAC system or the like. The individual helical separators are configured to receive the inflowing contaminated air and egress the clean air along a common longitudinal flow axis of the separator, and the separators are arranged in the array such that their longitudinal flow axes are mutually parallel. The array housing is modular, preferably comprising the four sidewalls 201-204 and the two parallel spaced upstream and downstream cover plates, 205, 206 oriented orthogonally to the flow axis and to which the upstream and downstream ends, respectively, of the individual helical separators are secured. The helical separator array may be employed in a filter system configured to direct particles that are removed from the air flow through the individual separators into a common waste collection receptacle that collects accumulated separated particles at its bottom where they may be continuously or selectively purged using air pressure from an eductor system or by inducing a negative pressure through the array and receptacle from an external device.

The air delivery system for the helical separators in the filter system may be comprised of a single fan or a plurality of small fans configured in a fan array where each fan in the fan array forces air through a respective plurality of helical separators in the separator array. Each individual helical separator array has a known static pressure drop that does not change with use, contrary to the situation with conventional fabric filters that collects the removed particulate matter on the filter, thereby significantly changing its resistance to airflow with use. A fan array allows the fans to be staged as building air flow demand increases or decreases; accordingly, as building demand decreases and individual fans are staged off, each fan may be isolated with a normally closed/fail-closed damper to prevent air recirculation through the idle fan, but it is not required.

The preferred helical particle separator element preferably comprises a cylinder whose central longitudinal axis constitutes the separator flow axis, and contains vanes or blades that are spirally configured about the flow axis. These vanes induce the helical flow in the contaminated inflow air that propels heavier/denser particulate matter radially outward along the interior surface of the cylinder boundary wall at the outer edge of the air column as the column moves through the particle separator element. At no point is the airflow "uncontrolled" or "unchanneled" as it passes through the apparatus, thereby reducing any possibility of turbulence-induced back pressure. This is compared to prior art systems that force air into a relatively open and unchanneled space, creating turbulence and increasing overall system inefficiency.

Unlike prior art systems, the preferred embodiments disclosed herein involve a straight or axial path for the air column from the dirty air inlet to the clean air outlet in the individual helical separator elements and through the filter system in which they are employed in an array. Thus, where the air columns in the aforesaid Meirav et al patent are forced to make at least two and possibly more such 90° turns between entering and exiting the apparatus, the embodiments disclosed herein require no such course alterations, thereby providing for improved energy efficiency.

Incorporating a straight, axial path through the particle separation process also reduces the potential for contaminants to be reintroduced into the air column once the helical flow has accomplished its particle separation task. Prior art designs also introduce the potential for undesirable particulate matter in the incoming dirty air column to be randomly deposited on interior surfaces within the enclosure which requires regular maintenance to prevent the particulate matter from being reintroduced into the clean air.

In another aspect of the invention, a particle scavenging arrangement and method is provided wherein particles removed from the contaminated air by the individual helical particle separators are collected in a waste receptacle common to all or multiple helical separators in the filter array. The collected particles may be continuously removed from the receptacle and the filter system by establishing a flow of exhaust air through the element array and the waste receptacle to an appropriate environment. It should also be noted that propelling the main air column into a closed box or a flat plane as is done in the Meirev et al system, with the expectation that the turbulence created will not cause the expelled particulate matter to be reintroduced into the supposed clean air column as it changes course to somehow exit the apparatus, is not a viable solution. It will also be understood that "bouncing" the air column against a solid surface such as the bottom of a box intended to capture rejected particulate matter, or against the 90° elbows noted above, will create vibrations in the containing walls, necessitating some form of sound insulation or attenuation to meet occupancy expectations and possibly code requirements.

BRIEF DESCRIPTION OF THE DRAWINGS

By way of example, specific embodiments of the present disclosure will now be described, with reference to the accompanying drawings, in which.

DETAILED DESCRIPTION

The present embodiments will now be described more fully hereinafter with reference to the accompanying drawings, in which several exemplary embodiments are shown. It will be readily understood that the components of the embodiments as generally described herein and illustrated in the appended figures may be arranged and designed in a wide variety of different configurations. Thus, the following more detailed description of various embodiments, as represented in the figures, is not intended to limit the scope of the present disclosure but is merely representative of various embodiments. While the various aspects of the embodiments are presented in drawings, the drawings are not necessarily drawn to scale unless specifically indicated.

The subject matter disclosed herein may be embodied in other specific forms without departing from its spirit or essential characteristics. The described embodiments are to be considered in all respects only as illustrative and not restrictive. The scope of the invention(s) is/are, therefore, indicated by the appended claims rather than by this detailed description. All changes that come within the meaning and range of equivalency of the claims are to be embraced within their scope.

Reference throughout this specification to features, advantages, or similar language does not imply that all of the features and advantages that may be realized with the disclosed apparatus, system and method should be or are in any single embodiment. Rather, language referring to the features and advantages is understood to mean that a specific feature, advantage, or characteristic described in connection with an embodiment is included in at least one embodiment. Thus, discussions of the features and advantages, and similar language, throughout this specification may, but do not necessarily, refer to the same embodiment.

Furthermore, the described features, advantages, and characteristics of the disclosed systems may be combined in any suitable manner in one or more embodiments. One skilled in the relevant art will recognize, in light of the description herein, that the embodiments can be practiced without one or more of the specific features or advantages of a particular embodiment. In other instances, additional features and advantages may be recognized in certain embodiments that may not be present in all embodiments.

Reference throughout this specification to "one embodiment," "an embodiment," or similar language means that a particular feature, structure, or characteristic described in connection with the indicated embodiment is included in at least one embodiment. Thus, the phrases "in one embodiment," "in an embodiment," and similar language throughout this specification may, but do not necessarily, all refer to the same embodiment.

Figure 1:
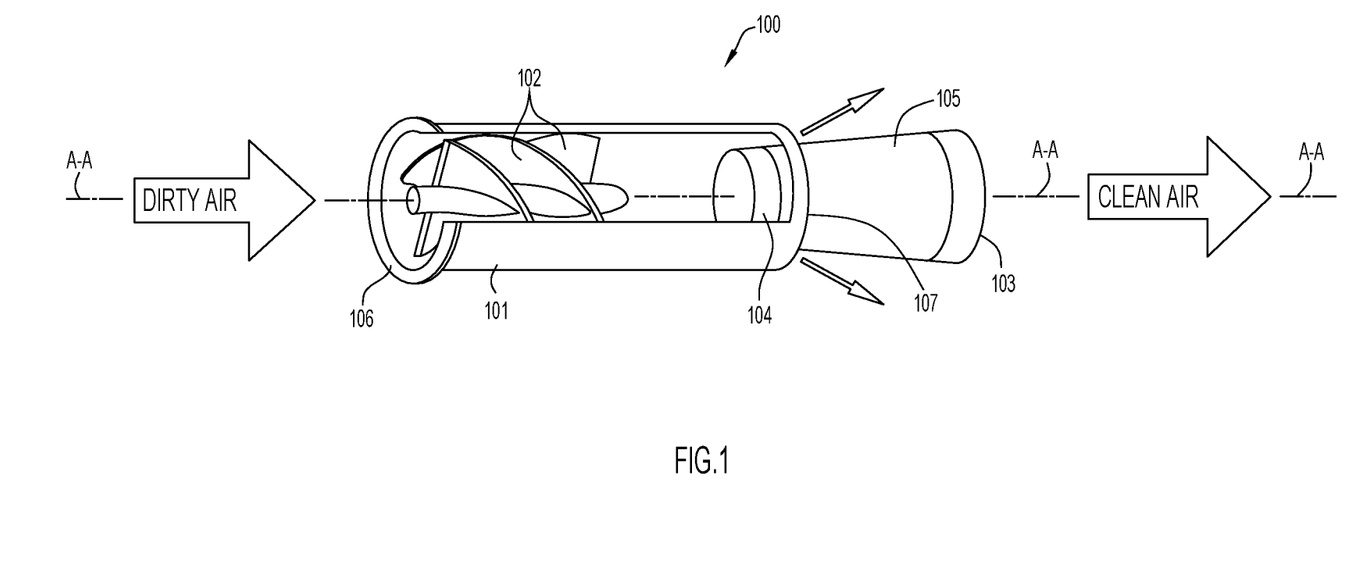
FIG. 1 is a diagrammatic cutaway view of an individual helical particle separator that may be used in the system and method disclosed herein.

FIG. 1 depicts a preferred type of helical particle separator unit 100 to be employed in a particle separator array such as described below. Separator unit 100 is of the general type disclosed in US2021/0107058 (Ruh et al) and includes a cylinder 101 having a central longitudinal axis A-A, an open upstream inlet end 106 for receiving inflowing contaminated (i.e., "dirty") air to be cleaned, an open downstream end for issuing clean air, and a cylindrical interior surface extending between the upstream and downstream ends. The upstream and downstream ends and the interior surface are all coaxially disposed about axis A-A. A portion of the wall of the cylinder has been cutaway in FIG. 1 to permit showing the internal components of the unit. A helical member is located inside the cylinder just beyond upstream end 106 and comprises a plurality of blades or fins 102 that are spirally configured about the central axis A-A of cylinder 101 and extend radially from that axis into peripheral contact with the interior wall of the cylinder. Blades 102 are configured to redirect the axially directed inflowing air into a swirling or helical flow downstream of the blades. Two such blades 102 are shown in FIG. 1, but it is to be understood that the number of blades employed is a matter of design choice depending on, among other things, various flow parameters such as the flow rate of the inflowing air, the pressure drop resulting from the flow pattern conversion, the degree of flow spin required, etc. The blades may subtend an angle of approximately 180° about the cylinder centerline but this is also a matter of design choice. As shown in FIG. 1, for purposes of clarity, blades 102 extend only a short axial distance downstream from upstream end 106; however, it is to be understood that the blades may extend over a greater, if not most of the length of cylinder 101.

An ejector 103 is configured with a short hollow cylindrical hollow neck section 104 at its upstream concentrically about axis A-A. Neck section 104 is in flow communication with an axially longer downstream diverging hollow conical section 105 extending downstream therefrom and having its longitudinal axis concentric with axis A-A. The upstream end of the ejector, including all of neck section 104 and a short length of conical section 105, extends concentrically into the open downstream end 107 of cylinder 101 to define an annular egress space between the ejector 103 and the interior surface of the cylinder.

Omitted from the drawing to facilitate clarity are three or more strut elements extending radially between ejector 103 and the interior surface of cylinder 101 to maintain the ejector positionally fixed within the cylinder. The particle separator unit 100 may be a unitary molded or 3-D printed plastic product.

In operation, axially flowing contaminated air enters the upstream end of cylinder 101 and is swirled in a helical flow by the blades 102. Because of centrifugal force acting on the particles in the helical airflow, a composite airflow is created comprising a clean air core surrounded by a boundary layer of particle-laden air. The rotating particle-laden air flows downstream along the interior wall of cylinder 101 and out of the unit via a waste opening defined by the annular space between the cylinder 101 and the diverging conical section 105. The clean interior core air flows through the conical section 105 of the ejector along axis A-A and out of the unit, separately from the particulates. Thus, the clean core of outlet air is coaxially aligned with the contaminated inflowing air entering the unit at inlet end 106.

Preferred aspects of particle separator 100 as used in the HVAC filter embodiments described below are: (a) individual particle separators are preferably, but not necessarily, 1¼" or greater in length; and (b) the inflowing contaminated air is preferably passively converted to helical flow by vanes or fins, rather than by redirecting the contaminated inflowing air to flow tangentially into a vortex chamber.

Multiple helical separator units 100 may be assembled in an array as illustrated in FIGS. 2, 3, 4 and 5. More specifically, a particle separator array unit 200 is shown with a square configuration but may be configured differently to accommodate different applications and installations. The transverse (i.e., to flow) dimensions of unit 200 are defined by four thin sidewalls 201, 202, 203, 204, each of which, in one example, may have a length of approximately twenty-four inches. The width of the outer walls (i.e., in the flow direction), which defines the thickness of the unit, is typically in the range of two to eight inches. A downstream cover plate 205, having an array of multiple through holes or apertures formed therein, defines the downstream side of unit 200. An upstream cover plate 206 (shown in the filter system 400 of FIGS. 4 and 5 but removed in FIG. 3 to permit viewing of internal components) has a similar array of holes or apertures formed therein and defines the upstream side of the housing. Each aperture in the array in upstream cover plate 206 is paired in axial alignment (i.e., in the flow direction) with a respective aperture in the aperture array in downstream cover plate 205. This alignment permits each pair of apertures to engage and support a respective helical particle separator 100 illustrated in FIG. 1. In this manner, the configuration of the aperture arrays defines the locations of the particle separators in the separator array.

Figure 2:
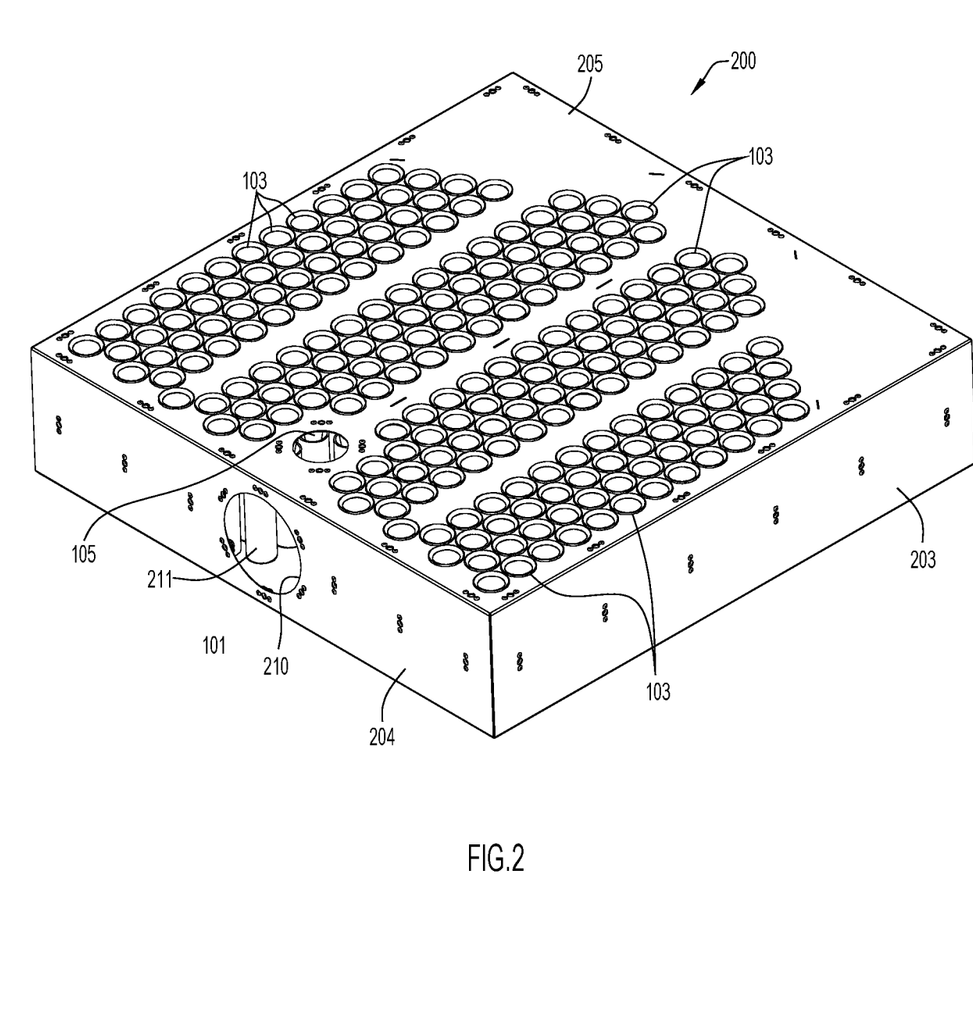
FIG. 2 is a perspective view from outflow (downstream) side of an array of helical particle separators of the type illustrated in FIG. 1 according to the present disclosure.
Figure 3:
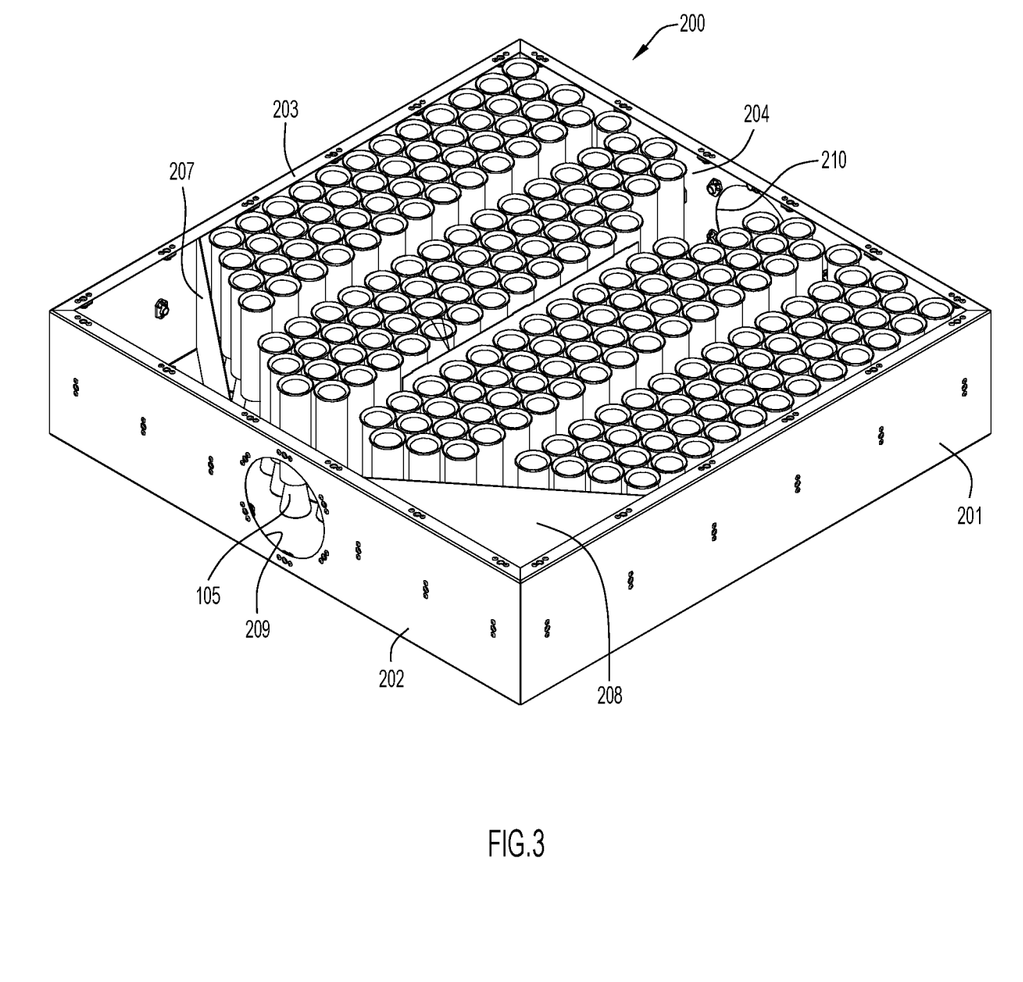
FIG. 3 is a perspective view from inflow (upstream) side of the array of FIG. 2 with the upstream cover plate removed for purposes of clarity.

More specifically, each aperture in downstream cover plate 205 has the downstream end of a respect ejector 103 of a helical separator 100 secured therein. The upstream end of that helical separator extends into and is secured within the aperture of upstream cover plate 206 that is in paired alignment with said each aperture. In forming the array of separators, the upstream end of the cylinder 101 of each separator is inserted through a respective aperture from the downstream side of plate 205 until the downstream end of its ejector 103 is in force-fit annular engagement with the annular wall of its respective aperture. In this position the open upstream end of that cylinder extends into and in engagement contact with the annular wall of the paired aperture in plate 206. The plate areas surrounding these engagements may then be heated to partially melt the engaged parts, and then cooled to permanently secure the helical separators in place, extending between its paired apertures in the cover plates. Since paired apertures are aligned parallel to the airflow direction, all the particle separators and their central flow axes A-A are aligned parallel to one another in that direction.

As best seen in FIG. 3, two support plates 207, 208 extend diagonally between the interior surfaces of bottom wall 202 and respective sidewalls 203, 201 to serve as support ribs between these walls and as opposing sides of a two-sided funnel-like structure for particles that fall in the array unit 200 when removed from the air flow by the array of helical separators. An array outlet opening 209, defined as a through hole in bottom wall 202, is located centrally in that wall to receive and provide egress for the falling particles. The egressing particles are drawn into an exhaust system in flow communication with outlet opening 209 as part of a particle scavenging process described below. An inlet opening 210, defined as a through hole in top wall 204, may be provided centrally in that wall to admit exhaust air into the array unit 200 from an adjacent unit when two array units 200 are stacked in parallel, as best seen in FIG. 5, to assist in the particle scavenging process.

Figure 9:
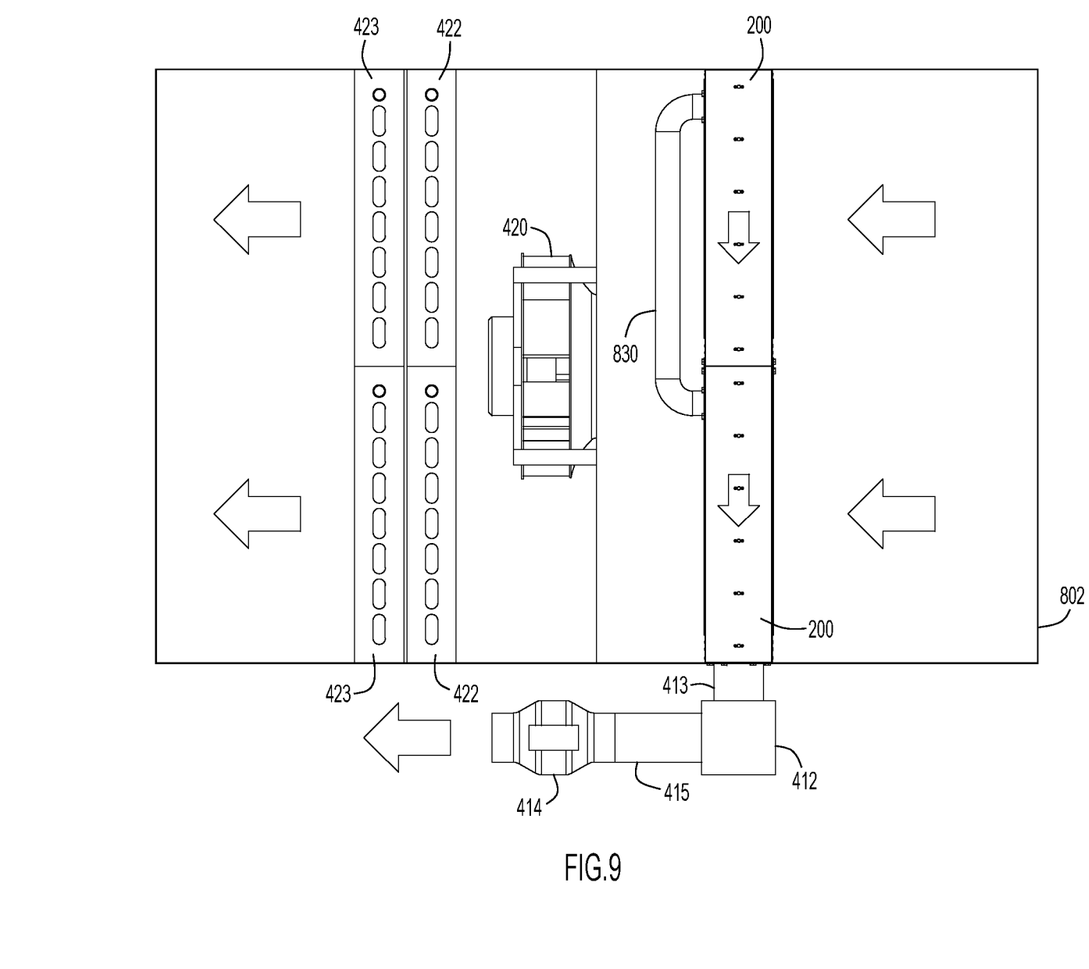
FIG. 9 is a side view of the filter system of FIG. 8.
Figure 10:
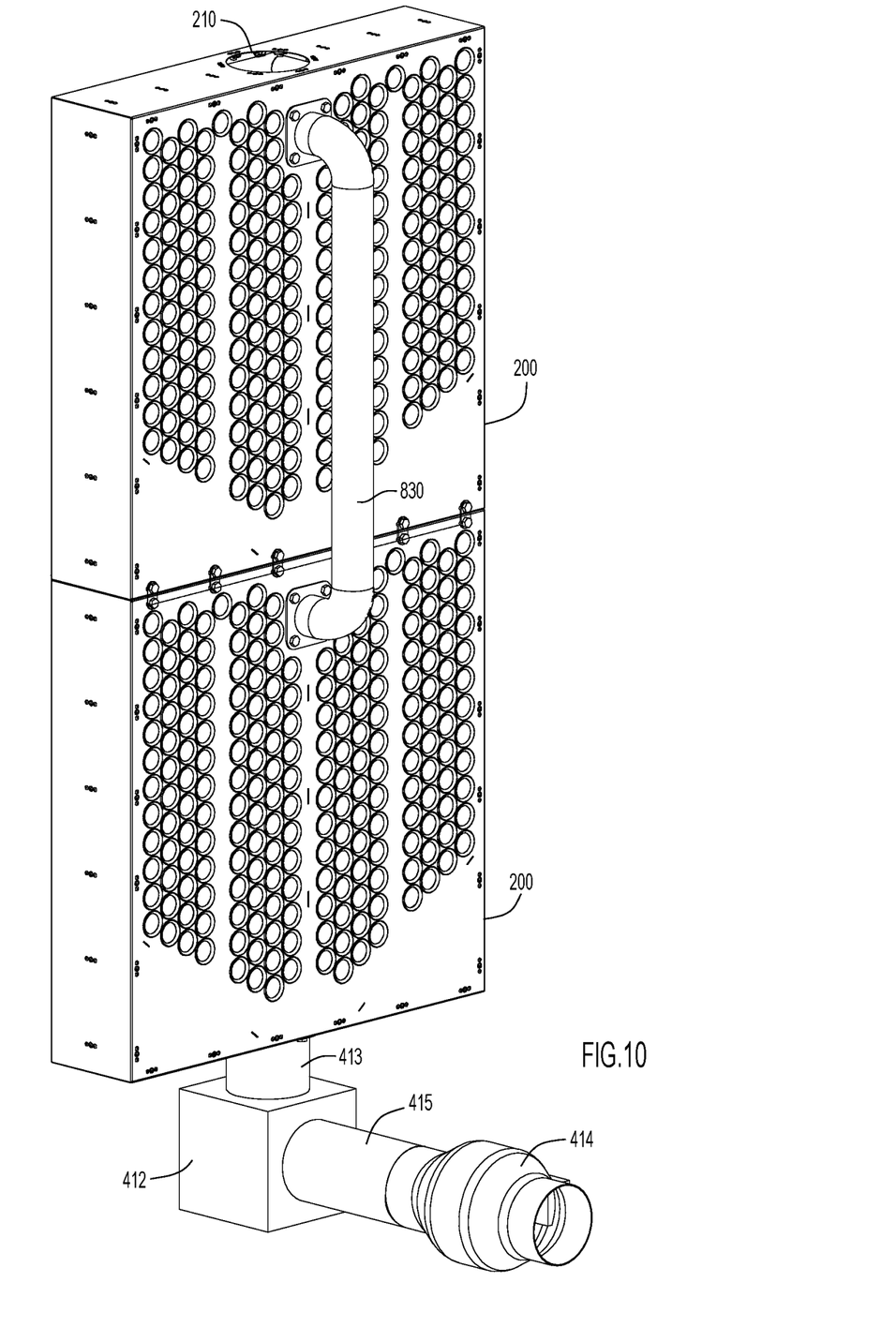
FIG. 10 is a perspective view of the parallel stacked arrays of FIG. 8 shown from the outflow side and removed from the filter assembly.
Figure 11:
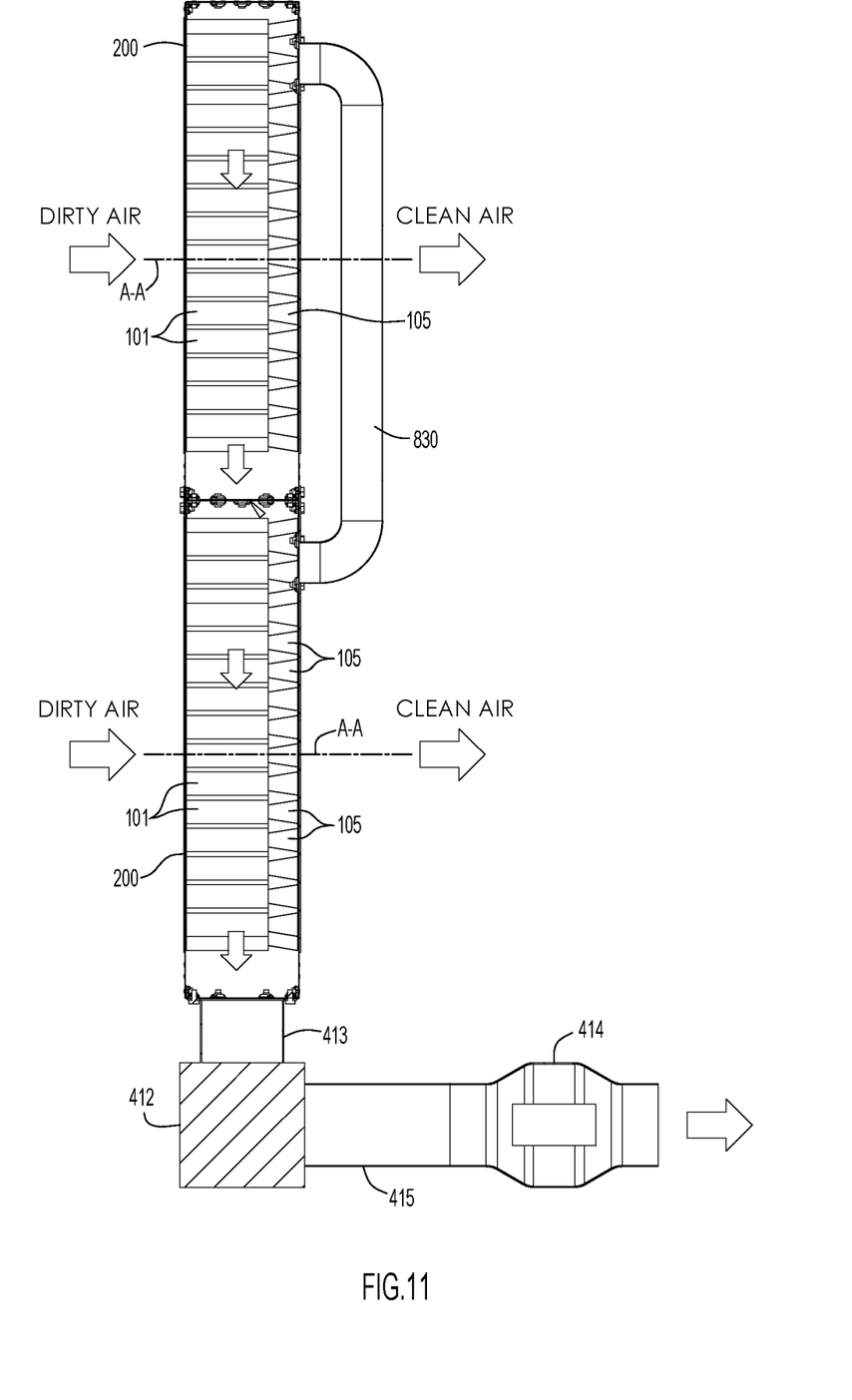
FIG. 11 is a side view in section the parallel stacked arrays of FIG. 10.

As shown in FIG. 2, a pressure equalizer outlet opening 211 is defined through downstream cover plate 205 between sections of the aperture array to permit connection to a pressure equalizer line (e.g., line 830 in FIG. 9) that may be connected between two array units 200 as described below.

Figure 4:
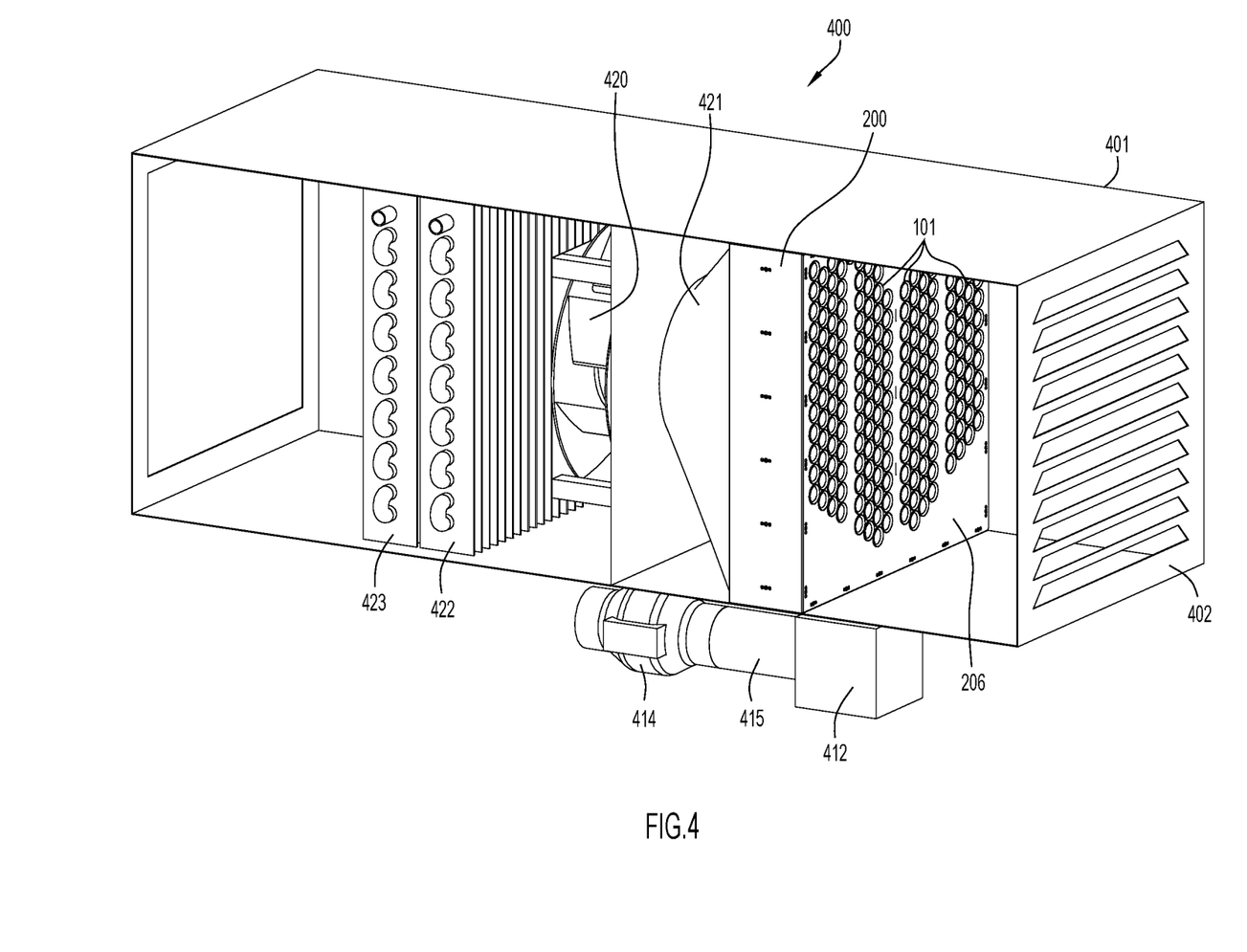
FIG. 4 is a perspective view from the side, with the side wall removed for clarity, of a filter system employing the array of FIG. 2.
Figure 5:
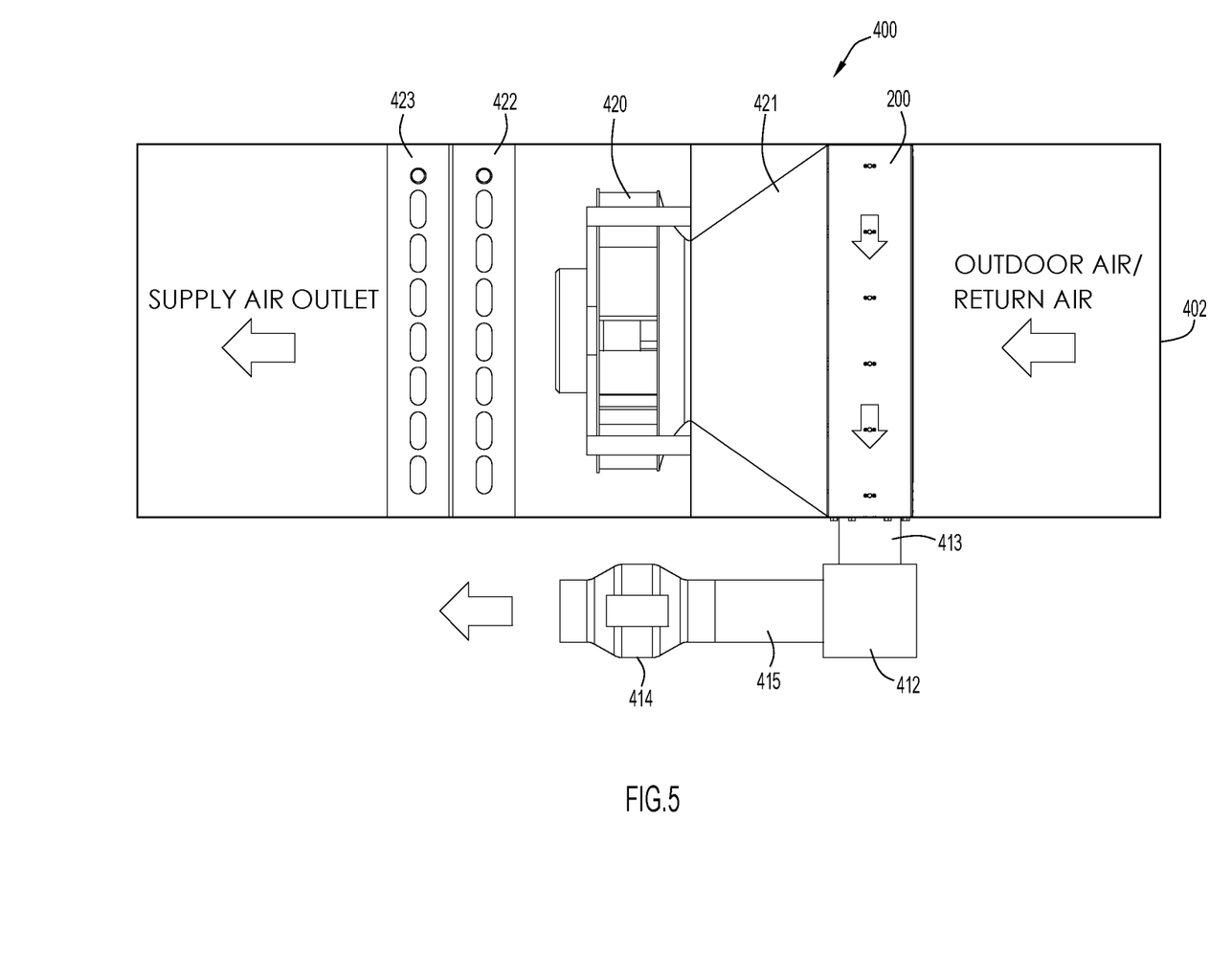
FIG. 5 is a side view in elevation of the filter system of FIG. 4.

The filter system 400 shown in FIGS. 4 and 5 is enclosed in a housing 401 that may be configured as an elongate rectangular parallelepiped. A louvred inlet wall 402 admits contaminated (i.e., outdoor and/or return) air which is drawn into the housing by an internally contained main fan 420. The inflowing contaminated air is drawn through louvered wall 402 and directed generally perpendicularly toward upstream cover plate 206 where portions of the air are caused to flow into the inlet openings of respective particle separators 101 in the separator array unit 200 secured in place a short distance downstream of wall 402. The particle-laden waste air egressing from each particle separator unit 101 flows into the space defined between cover plates 205 and 206 where it combines with exhaust flow in a particle scavenging system. Specifically, particles removed by the particle separators in the particle separator array unit egress from the array via outlet opening 209 (FIG. 3) and are passed to a waste receptacle 412 via a connecting conduit 413. An inline scavenger fan 414 creates an exhaust flow through particle separator array 200 that scavenges removed particles by aspirating them from the array interior and receptacle 412 via a conduit 415 on a continuous or on an as-needed basis. The scavenged particles in the outflow from fan 414 may be directed outside the building/equipment or into other safe containment as the situation requires The clean air outflow from particle separator array unit 200 may be directed through a square-to-round flow adapter 421 connected between array unit 200 and fan 420. Adapter 421 serves to funnel and transversely condense the air axially flowing therethrough from the individual helical separators into a generally cylindrical flow pattern that is less turbulent and more efficiently confined when reaching the fan. The outflow from the fan may pass through an air temperature modifying unit such as heating coil unit 422 and/or cooling coil unit 423 before egressing from the open downstream end of housing 401 and entering a duct system being serviced by the filter system 400.

Figure 6:
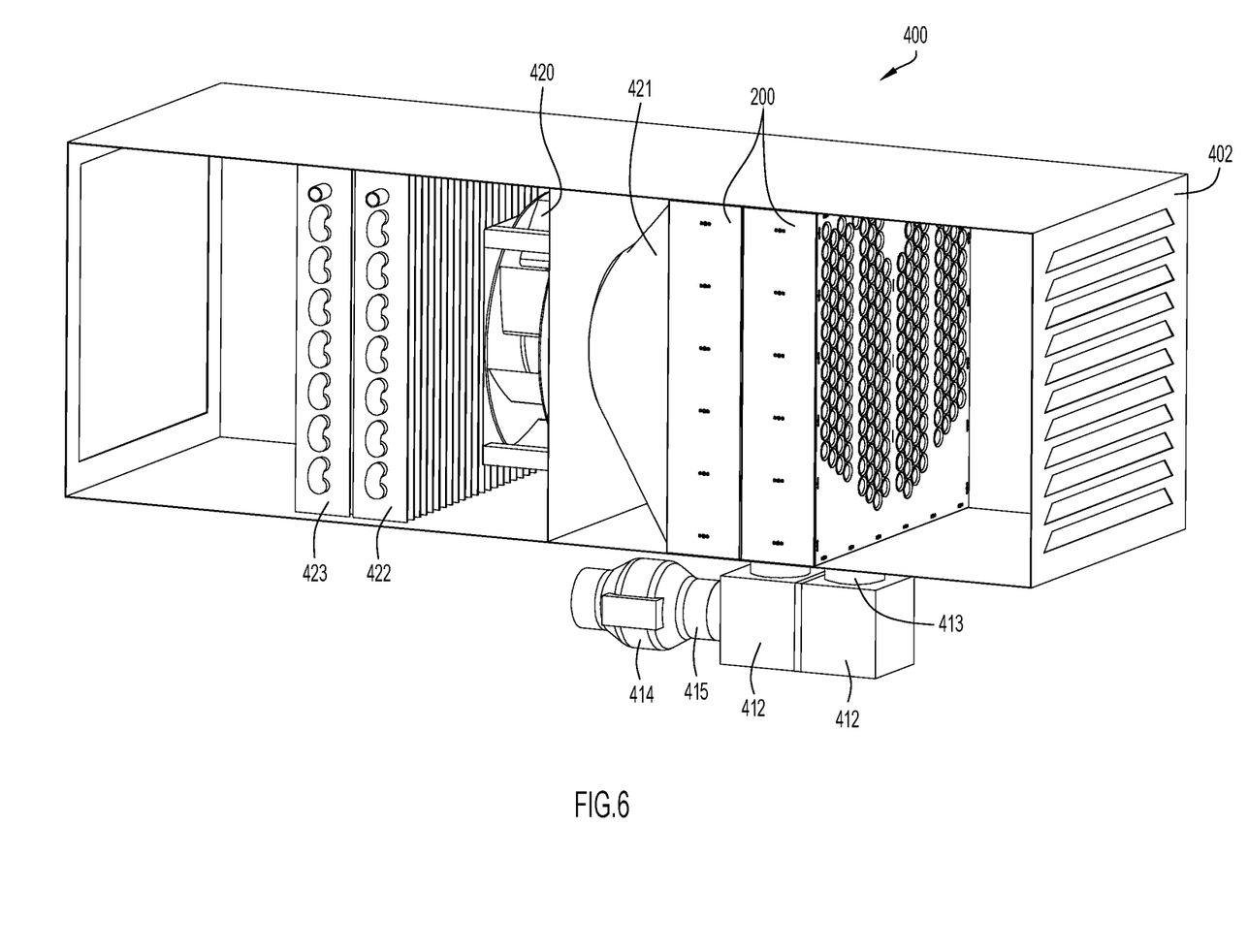
FIG. 6 is a perspective view from the side, with the side wall removed for clarity, of a filter system having two serially stacked arrays of the type illustrated in FIG. 2.
Figure 7:
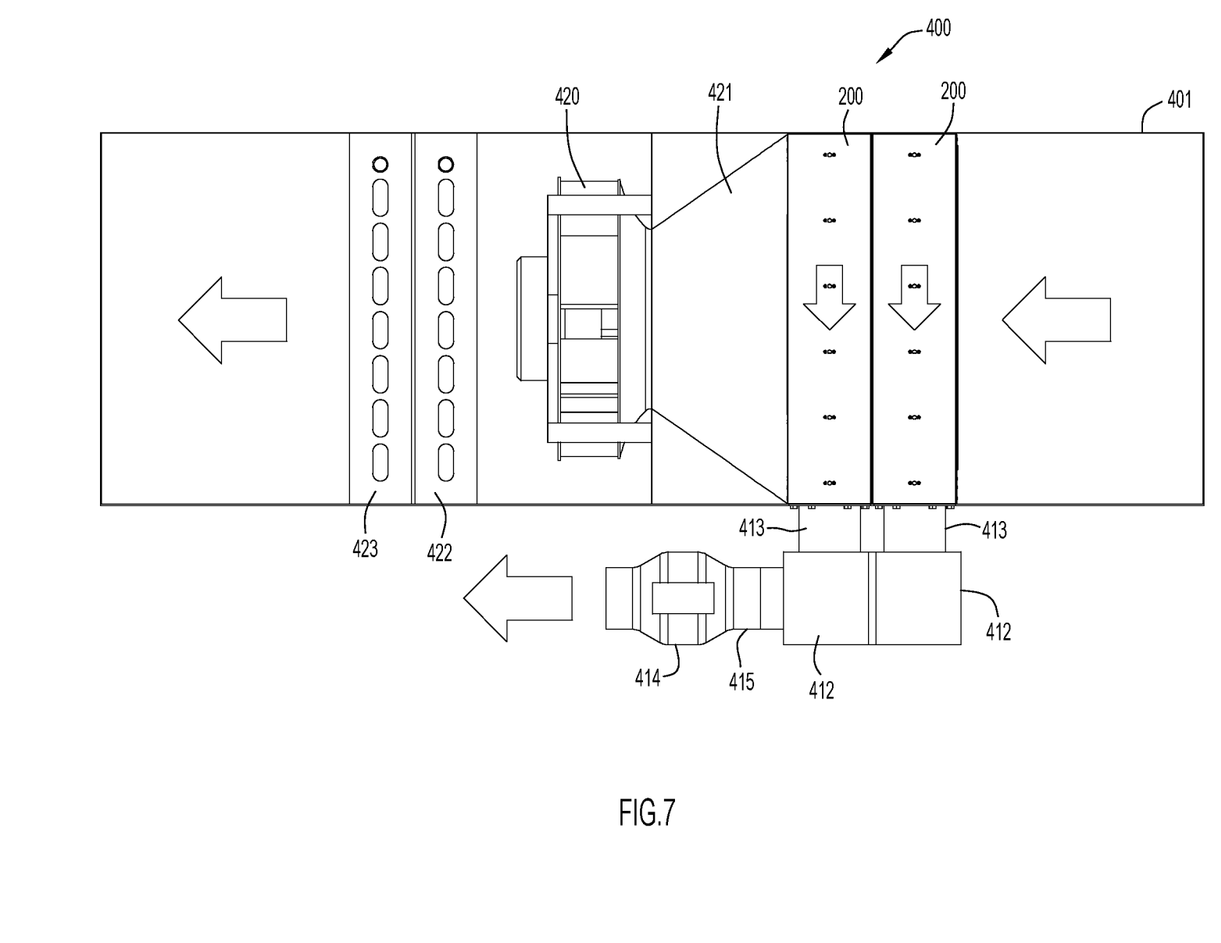
FIG. 7 is a side view of the filter system of FIG. 6.

The filter system embodiment 400a illustrated in FIGS. 6 and 7 differs from system 400 illustrated in FIGS. 4 and 5 by the addition of a second substantially identical particle separator array unit 200. The two array units are stacked in series (i.e., in sequential adjacency in the flow direction) to provide enhanced particle separation from the inflowing air. The stacked array units may be secured to one another by any conventional means such as brackets or other members extending between and secured to the outside surfaces of each unit by screws, bolts rivets, etc.

In the filter system embodiment 800 illustrated in FIGS. 8-11, two array units 200 are stacked in parallel (i.e., in the same plane, perpendicular to the flow direction) with one above the other. These stacked units may be secured to one another by screw, bolts, rivets, etc. extending through abutting side walls of the units. Such stacking requires the system housing 801 to be taller than housing 401 to accommodate the stacking configuration. A louvred inlet wall 802 admits contaminated (i.e., outdoor and/or return) air which is drawn into the housing by an internally contained main fan 420. The contaminated air is drawn through array units 200 in parallel. Particles removed from the air flow by particle separators in the upper particle separator array unit drop through outlet opening 209 (FIG. 3), pass through inlet opening 210 (FIG. 3) of the lower particle separator array unit into and through the lower array unit, and then into receptacle 412 via conduit 413 along with particles removed by the particle separators in the lower particle separator array unit. Inline scavenger fan 414 creates an exhaust flow through the stacked array units that scavenges removed particles by aspirating them from receptacle 412 via conduit 415 on a continuous or on an as-needed basis. A pressure equalizer line or conduit 830 extends between the pressure equalizer outlet openings 211 (FIG. 2) of the two array units 200 on their downstream sides to maintain equal pressures in the two array units. Fan 420 draws the air through filter housing 800, as above described, and additional heating coils 422 and/or coiling coils 423 may be provided as needed.

It will be understood the number of serially or parallel stacked array units 200 need not be limited to two, and that the system concept includes the virtually unlimited versatility provided the modularity of these units. It will also be appreciated that the number of separators 100 that can be used in any array depends on the particular application and can be as few as two and as many as ten thousand or more as necessary to achieve air filtration efficiency for any particular filter system.

The presently disclosed embodiments for removing particulates from an air flow in an HVAC system may include one or more fans arranged to drive or draw air through an array of helical particle separators. The fan(s) and helical particle separators are combined in a modular assembly that can be installed as a standalone unit or built into a large number of units working together to meet air flow demand in various applications. Particle separation is effected by forcing air through an array of helical separators containing spirally configured vanes to convert axial flow into helical flow. The resulting high velocity helical airflow enables centrifugal force to effectively propel contaminants to the outer wall of the separator and then into a receptacle which may be under continuous negative pressure generated by an eductor system or external device such as a fan or vacuum pump. The negative pressure, or scavenger air, purges contaminants from the unit. The unit has been found to provide up to 94% air filtration efficiency, which has the potential to completely replace a (Minimum Efficiency Report Value) MERV 14 filter and significantly increase the life of a MERV 16 filter.

Although the preferred particle separator elements are the helical separator type exemplified by the embodiment of FIG. 1, The scavenger system disclosed herein, including a common waste collection receptacle and a negative pressure source for continuously exhausting removed particles through the element array and from the waste collection receptacle, may be used with any type of fluid dynamic particle separators, including those used in the above-referenced Meirev et al system.

The preferred approach for inducing the rotating flow for HVAC systems in the embodiments disclosed herein is a conversion of the axially flowing contaminated air to helical flow by means of passive vanes or blades, rather than by redirecting the contaminated axial inflow tangentially into vortex particle separators as, for example, disclosed in the above-referenced Meirev et al system, which introduces undesirable redirections and pressure variations in the flow.

Due to the fixed static pressure drop that does not change based on how dirty the filter is, the separator unit can utilize many existing fan technologies as an integral part of each module. The result is a highly efficient, low cost, operating system when compared to systems utilizing conventional filters. A built-in fan array, with each fan a serving respective section of the particle separator array unit, may be used instead of a single fan in a manner that readily overcomes any pressure drop that may be created by the particle separators. Such an array permits selective operation of one or more sections of the filter element array in accordance with changing ambient conditions and other needs for the system. A fan array can function not only to provide the catalyst for air filtration but also assist or replace the main system fan design by significantly reducing the size of, or altogether eliminating, the main ventilation system fan.

We have found that utilizing the present filter system saves, on average, a minimum of 21.5% of total fan energy requirements when compared to a clean conventional fiber filter. Moreover, as fiber filters collect dirt, their energy efficiency decreases dramatically, a problem that does not exist for the present filter system in which dirt particles are continuously collected and removed.

The particle separator array unit 200 may be configured to be similar in size and shape to conventional HVAC ventilation system filters; therefore, it is easily installed in new Air Handling Units (AHU) or retrofitted as a replacement unit into existing AHU ventilation systems.

Aspects of the present particle separator array as tested in accordance with the 2020 ASHRAE Manual chapter 29.4 section 7/ASHRAE 52.2 using 'ASHRAE Test Data Dust #2' enables the following key features:

1. The present filter system may include all operational components in a single modular unit and employ fan(s), an array of helical particle separators, and a common particle collection chamber purged by scavenger air.
2. The particle separator array unit 200 is permanent; that is, the individual particle separators 100 are not consumable components and require minimal maintenance. Each array unit 200 has a life expectancy of approximately thirty years, which meets or exceeds that of the ventilation system itself.
3. From an efficiency perspective, the particle separator array unit 200 operates with significantly less pressure drop as compared to other designs that attempt to achieve air filtration by redirecting the air multiple times within vortex separators in which extremely high static pressure drops result in inefficient system operation. The present system spins the air without introducing any overall directional changes in the air stream which would result in a fixed, low static pressure drop.
4. When applied to conventional HVAC ventilation systems, the present particle separator array unit requires no additional means of air filtration in order to meet MERV 14 air quality standards as defined in the 2020 ASHRAE Handbook Chapter 29.10 Table 3 and as defined in ASHRAE 52.2.
5. Each array module is similar in size to standard HVAC system filters, thereby enabling it to be deployed in current HVAC ventilation systems.

Without limitation, it will be appreciated that some commercial applications for the particle separator array unit include: commercial HVAC/Custom Air Handling Systems to filter return and/or outside air; light commercial HVAC systems to filter return and/or outside air; and residential HVAC systems to filter return and/or outside air. Depending how it is applied, the separator unit is effective to: significantly increase the life of conventional filters or eliminate the need of such filters altogether; qualify the owner for LEED points due to being environmentally friendly; improve efficiency and operational costs due to low static pressure drop; require little maintenance and minimal upkeep; and be easily adaptable to existing infrastructure.

Summarizing, as shown in the drawings and described above, the present filter system 400 is comprised of four major components: a fan assembly (unitary or an array of fans), one or more particle separator arrays, a waste collection receptacle and a scavenger air assembly. The waste collection receptacle 412 may be stackable, tall, wide, and deep. The individual particle separator components 100 function by forcing high velocity air through each individual helical particle separator. Debris is removed from the air stream in each separator component as a function of centrifugal force and exits into the waste collection chamber along with particles removed by all of the other separators in the array. The collected particles may be removed from the system continuously by scavenger air. Clean air travels out of the particle separator and is delivered to the building's main ventilation system. The use of one fan to supply the airflow required for multiple particle separators permits the system to function efficiently while overcoming the static pressure drop so that no additional strain is put a building's existing infrastructure.

Figure 8:
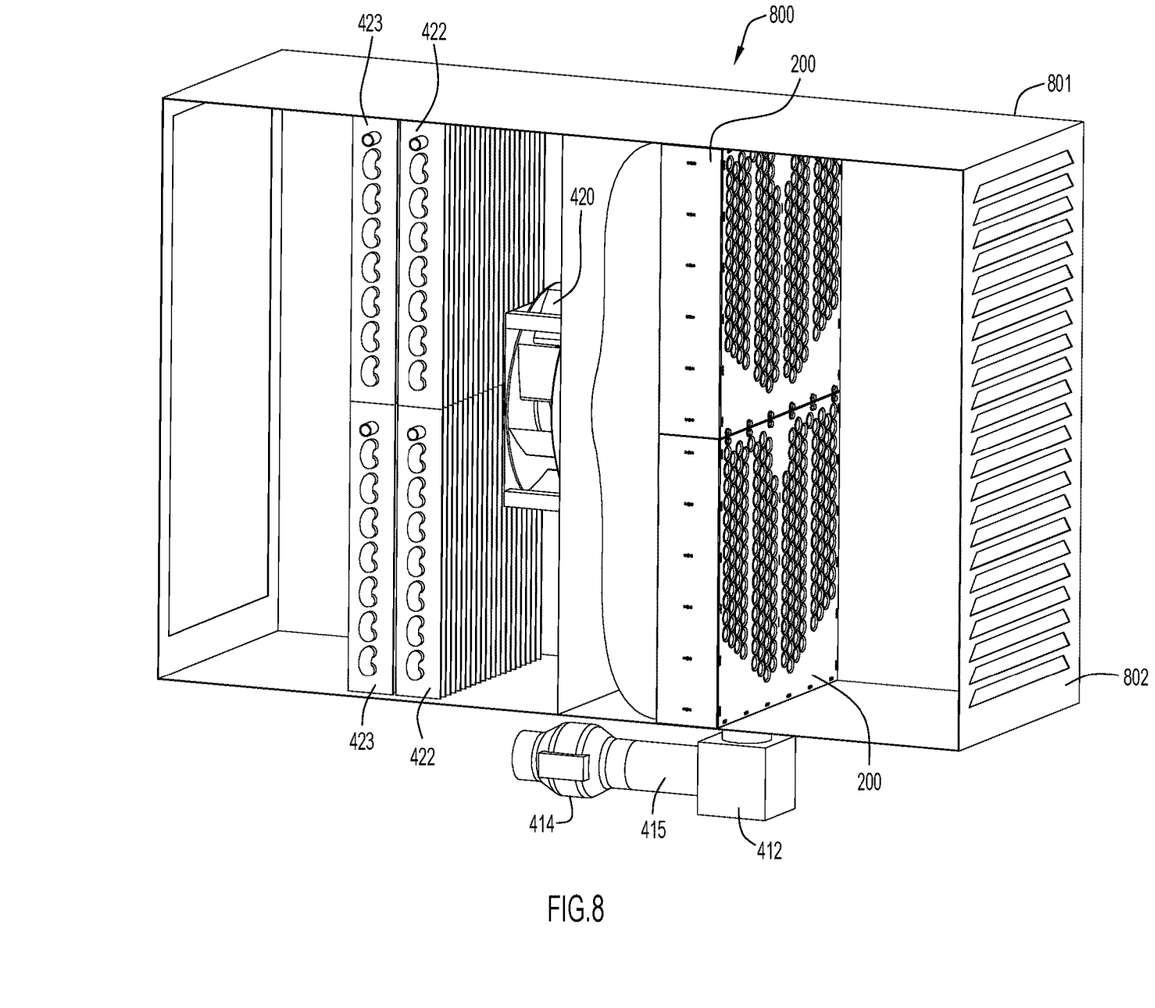
FIG. 8 is a perspective view, with the sidewall removed for clarity, of a filter system having two parallel stacked arrays of the type illustrated in FIG. 2.

The waste collection receptacle performs two major functions. Primarily, the receptacle provides the necessary structural support for the particle separators to contain them within the airstream and allow them to function as intended. Secondly, the receptacle serves as the vessel that safely contains debris/contaminants that have been removed from the airstream by the particle separators before the particles are purged from the building/equipment using scavenger air. The receptacle may be configured to hold different quantities and styles of separated particles to accommodate virtually any application. As shown in FIG. 8, the receptacle is configured to be stackable with the filter assembly.

When air flow or quality requirements exceed the capacity of a single array or module, the unit is simply duplicated as many times as necessary to meet a particular requirement. As a general rule, stacking arrays vertically, so that they function in parallel, increases air flow capability, whereas stacking arrays horizontally, so that they function in cascade or series, increases air quality.

Designed with modularity in mind, the filter system is easily adaptable to new or existing HVAC infrastructure The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Furthermore, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. A fluid dynamic filter assembly for use in building ventilation systems to remove particles from inflowing contaminated air flowing in a predetermined direction in said assembly, said assembly comprising a first array of multiple helical particle separator units,
   wherein each separator unit comprises:
      a longitudinal axis
      an inlet opening disposed concentrically about said axis for receiving a portion of the inflowing contaminated air along said axis;
      at least one blade spirally oriented about said axis and configured to divide contaminated air received from said inlet opening into a composite airflow about said axis comprising a clean air core surrounded a boundary layer of particle-laden air;
      an outlet opening disposed concentrically about said axis for issuing the core of clean air from the separator unit;
      a waste opening disposed annularly about said outlet opening for conducting said boundary layer out of the separator unit;
   wherein the array is configured with the longitudinal axes of said multiple particle separator units in a mutually parallel orientation and parallel to said predetermined direction;
   an arrangement for scavenging particles removed from the contaminated air comprising:
      a waste receptacle configured and disposed to collect the removed particles from said array; and
      a negative pressure source connected to draw scavenging air through said array and said waste receptacle to scavenge particles therefrom;
   wherein said array further comprises upstream and downstream cover plates arranged in parallel spaced relation, wherein each of said multiple separator units is secured to and extends between said cover plates; and
   further comprising a second array of multiple helical particle separator units stacked in coplanar relation and immediately adjacent said first array.

2. The filter assembly of claim 1 wherein each of said first and second arrays further comprises a sidewall having an array outlet opening defined therethrough for providing egress from that array via said scavenging air for particles removed from the contaminated air.

3. The filter assembly of claim 1 further comprising a third array of multiple helical particle separator units stacked in series with and immediately downstream from first array.

4. The filter assembly of claim 1 further comprising a pressure equalizer line connected between said first and second arrays to maintain the pressures within those arrays equal to one another.

5. The filter assembly of claim 1 wherein said first array further comprises upstream and downstream cover plates arranged in parallel spaced relation, wherein each of said multiple separator units is secured to and extends between said cover plates, and further comprising a sidewall having an array outlet opening defined therethrough for providing egress from said array for particles removed from the contaminated air.

6. The filter system of claim 1 further comprising:
   a filter housing; and
   at least one fan arranged and configured to drive or draw said inflowing contaminated air into said housing in said predetermined direction and into said first filter array and to force clean outflow air from said first array downstream of said fan in said predetermined direction.

7. The filter assembly of claim 6 further comprising an air temperature modifying unit arranged to receive and modify the temperature of clean outflow air from said fan.

8. A fluid dynamic filter assembly for use in building ventilation systems to remove particles from inflowing contaminated air flowing in a predetermined direction in said assembly, said assembly comprising a plurality of arrays of multiple helical particle separator units,
   wherein each helical particle separator unit comprises:
      a longitudinal axis
      an inlet opening disposed concentrically about said axis for receiving a portion of the inflowing contaminated air along said axis;
      at least one blade spirally oriented about said axis and configured to divide contaminated air received from said inlet opening into a composite airflow about said axis comprising a clean air core surrounded a boundary layer of particle-laden air;
      an outlet opening disposed concentrically about said axis for issuing the core of clean air from the separator unit;
      a waste opening disposed annularly about said outlet opening for conducting said boundary layer out of the separator unit;
   wherein the plurality of arrays is configured with the longitudinal axes of said multiple particle separator units in a mutually parallel orientation and parallel to said predetermined direction;
   an arrangement for scavenging particles removed from the contaminated air comprising a waste receptacle configured and disposed to collect the removed particles from said plurality of arrays; and
   wherein said plurality of arrays are positioned in coplanar relation and in immediate adjacency.

9. The filter assembly of claim 8 further comprising a pressure equalizer line connected between said arrays to maintain the pressures within those arrays equal to one another.

10. The filter assembly of claim 9 further comprising:
   a filter housing;
   at least one fan disposed in said filter housing and configured to cause said inflowing contaminated air to flow through said housing in said predetermined direction and into said arrays and to force or draw clean outflow air from said arrays downstream in said predetermined direction.

11. The filter assembly of claim 10 further comprising an air temperature modifying unit arranged to receive and modify the temperature of clean outflow air from said arrays.

12. The filter assembly of claim 8 further comprising:
a filter housing;
at least one fan disposed in said filter housing and configured to cause said inflowing contaminated air to flow through said housing in said predetermined direction and into said arrays and to force or draw clean outflow air from said arrays downstream in said predetermined direction.

13. The filter assembly of claim 10 further comprising an air temperature modifying unit arranged to receive and modify the temperature of clean outflow air from said arrays.

14. A building ventilation system fluid dynamic filter assembly for removing particles from inflowing contaminated air flowing in a predetermined direction in said system, said assembly comprising:
a plurality of at least first and second arrays of multiple helical particle separator units, each particle separator unit comprising:
a longitudinal axis
an inlet opening disposed concentrically about said axis for receiving a portion of the inflowing contaminated air along said axis;
at least one blade configured to divide contaminated air received from said inlet opening into a composite airflow about said axis comprising a clean air core surrounded a boundary layer of particle-laden air;
an outlet opening disposed concentrically about said axis for issuing the core of clean air from the separator unit;
a pressure equalizer line connected between at least said first and second arrays to maintain the pressures within those arrays equal to one another; and
a waste opening disposed for conducting said boundary layer out of the separator unit; and
an air temperature modifying unit arranged to receive and modify the temperature of clean outflow air from said plurality of arrays.

15. A building ventilation system fluid dynamic filter assembly for removing particles from inflowing contaminated air flowing in a predetermined direction in said system, said assembly comprising:
a plurality of at least first and second arrays of multiple helical particle separator units, each particle separator unit comprising:
a longitudinal axis
an inlet opening disposed concentrically about said axis for receiving a portion of the inflowing contaminated air along said axis;
at least one blade configured to divide contaminated air received from said inlet opening into a composite airflow about said axis comprising a clean air core surrounded a boundary layer of particle-laden air;
an outlet opening disposed concentrically about said axis for issuing the core of clean air from the separator unit;
wherein at least the first and second arrays are positioned in coplanar relation and immediately adjacent one another, each being configured with the longitudinal axes of said multiple particle separator units in a mutually parallel orientation and parallel to said predetermined direction; and
a waste opening disposed for conducting said boundary layer out of the separator unit; and
an air temperature modifying unit arranged to receive and modify the temperature of clean outflow air from said plurality of arrays.

* * * * *